April 11, 1933.  C. D. BURNEY  1,903,694
MOTOR ROAD VEHICLE
Filed Jan. 10, 1933  6 Sheets-Sheet 1

Inventor
Charles D. Burney

April 11, 1933.  C. D. BURNEY  1,903,694
MOTOR ROAD VEHICLE
Filed Jan. 10, 1933  6 Sheets-Sheet 2

Inventor
Charles D. Burney

April 11, 1933. C. D. BURNEY 1,903,694
MOTOR ROAD VEHICLE
Filed Jan. 10, 1933 6 Sheets-Sheet 4

Patented Apr. 11, 1933

1,903,694

UNITED STATES PATENT OFFICE

CHARLES DENNISTON BURNEY, OF WESTMINSTER, ENGLAND

MOTOR ROAD VEHICLE

Application filed January 10, 1933, Serial No. 651,063, and in Great Britain September 6, 1928.

The present application is a continuation of applications Serial No. 570,016, filed October 20, 1931 and Serial No. 608,841, filed May 2, 1932, the latter being a continuation in part of application Serial No. 506,459, filed January 3, 1931, as a division of application Serial No. 384,946, filed August 10, 1929, the said application Serial No. 570,016 having been based on British applications Serial Nos. 33,824 and 25,185, filed November 10, 1930 and September 8, 1931, respectively, and the said application Serial No. 384,946 having been based on a British application Serial No. 25,578, filed September 6, 1928, now Patent No. 320,725.

The invention forming the subject matter of the present application relates to motor road vehicles, and particularly to such vehicles wherein the propelling or power means are located in the vicinity of the axis of the rear wheels of the vehicle. This disposition of the power means, I have determined, is dictated by a number of considerations and is inevitable if a vehicle of optimum characteristics is to be produced. Before proceeding with the description of a specific embodiment of the invention, it will be desirable to discuss the considerations involved.

It is an incontrovertible fact that in motor road vehicles the weight distribution governs the efficiency of the springing, affects pitching during braking and acceleration, and largely governs the skidding propensities of the car while turning or braking. In short, the characteristics of road holding and comfort depend primarily upon the weight distribution.

In a car of orthodox design, the position of the center of gravity usually is midway between the front and rear wheel positions, so that under static conditions, the load is about equal on each of the four wheels. According to the theory underlying the present invention, however, the center of gravity should be so disposed that the weight distribution will be substantially equal on all four wheels under emergency conditions where the brakes have to be applied with maximum pressure with the vehicle travelling at high speed and perhaps on a greasy road. With the center of gravity so disposed, maximum adhesion of the wheels is obtained when it is most needed.

With a modern car fitted with powerful brakes, a deceleration in excess of twenty-four feet per sec. per sec. is possible and with normal height of center of gravity above the ground, this decelerating force increases the weight on the front wheels and decreases that on the rear wheels by an amount corresponding to a shift of the center of gravity through a distance equal to approximately one-sixth of the length of the wheel base with the result that during such deceleration, the adhesion load on the rear wheels is reduced to approximately one-third of the weight of the car.

To correct this condition, therefore, the present invention contemplates a weight distribution so that the position of the center of gravity under static conditions is situated at a point distant approximately one-third of the length of the wheel base in front of the rear axle. With this disposition, the resultant load on all the wheels will be equal under conditions of maximum deceleration. the equation being one-third plus one-sixth equals two-thirds minus one-sixth. Such a weight distribution can only be obtained with the engine of the vehicle positioned in the vicinity of the axis of the rear wheels and ordinarily behind said axis.

It is well known that an increase in the longitudinal moment of inertia of the car will reduce pitching and increase riding comfort. The problem, therefore, is to increase the longitudinal moment of inertia as much as possible, provided the longitudinal position of the center of gravity demanded by the braking conditions is not disturbed.

If any free rigid body is subjected to a transverse force at some point along its length near one end, there will be some other point toward the other end of the body at which, if the body is held there, no reaction on the support will occur. If the latter point is called the center of rotation, the first will be the corresponding center of percussion and the two points are conjugate. Mathematically, if the body is subjected to a force acting at the first of the two points, two effects occur simultaneously:—The body moves as a whole as if the force acted at the center of gravity; and secondly, the whole body has an angular rotation about the center of gravity. At the second point the lateral movement of the body is exactly equal and opposite to that due to rotation and thus this particular point remains stationary in space. Thus, if the body is acted upon by a force at the first point, it rotates as a whole about the second point, and if hinged at the latter, there will be no reaction at the hinge.

If A and B are the distances of center of percussion and center of rotation respectively from the center of gravity, and K is the radius of gyration of the body, then A and B are connected by the relation $AB/K^2 = 1$. It is the principle of the present invention that this same equation should hold in an automotive vehicle, A and B being the distances of the rear and front axles from the center of gravity and K the radius of gyration about the center of gravity, so that if the car is subjected to force or impact in the plane of one axle, whether vertically or horizontally, there will be no corresponding reaction in the plane of the other. A considerable improvement in both comfort and freedom from skidding inevitably follows the adoption of this principle as a feature of design.

In the orthodox car, the value of AB is not equal to $K^2$, but usually to something between 1.5 $K^2$ and 2.7 $K^2$. Considering the front wheels of such a vehicle to be passing over a bump or inequality, they are forced upward, compressing the front springs and rotating the body of the car as a whole about some point much nearer the center of gravity than the plane of the rear wheels. Thus the part of the frame immediately over the rear wheels swings downward compressing the rear springs. By this time, however, the rear wheels themselves have reached the same inequality and are subjected to an upward impulse, so that the effect of every inequality of the road surface is intensified on the rear wheels. It is as though every time the front wheels meet a bump in the road, the rear wheels are pressed down to meet the same bump with still greater intensity, while every time the front wheels drop into a hole, the rear wheels are lifted, so that they will drop into the same with still greater force.

Owing to the action of the springs, there will be a time lag between the effects. The impulse on the front wheels which compresses the front springs reacts on frame and body, rotating the latter and in turn compressing the rear springs which, in turn, react on the rear wheels. If the stiffness of the springing is known, the time for this sequence of operations is readily calculated. For an average car with normal springing, the time interval is exactly the same as that required for the inequality to pass from the front to the rear wheels at a speed which lies between 35 and 40 m. p. h. Thus, at ordinary driving speeds the effect is at its worst.

By arranging the weights along the length of the car, so that $AB = K^2$, this effect is minimized or entirely obviated. The effect is not to be confused with good or bad springing. Good springing minimizes the effects of impacts and shocks upon the passengers. By arranging the weights in the manner described, the magnitude of impacts and shocks to be taken up by the springs is itself reduced.

There is also the consideration of the conditions of equilibrium of the car and their effect on the possibility of skidding with turning on a curved path. The turn may be considered to comprise three phases:— (a) the first part of the motion, when turning into the curved path from the straight; (b) the middle phase or motion on the curved path with uniform linear and angular velocity, and (c) the latter part of the motion when the car is straightened out again from the curved to the straight path.

Considering first the second phase of the motion, when the car is turned with uniform angular velocity, the only lateral force to be considered is that due to radial acceleration or centrifugal force. This is balanced by the lateral forces between the wheels and road surfaces which prevent sideslip. Since both the resultant of the centrifugal forces and the resultant of the gravitational forces act at the center of gravity of the car, the lateral force at each pair of wheels tending to produce skidding will be proportional to the weight on the wheels. If, as is usually assumed, the limiting lateral force at which sideslip occurs is proportional to the applied weight on the wheels, there will obviously be a maximum curvature of path around which a car can turn with safety at each speed and for a given condition of road surface. If turning more sharply, skidding or sideslip will occur, but the tendency to skid will be equal as between both front and rear wheels and is entirely unaffected by the distribution of weight along the length of the car. If the position of the center of gravity is nearer the rear than the front wheels for instance, the centrifugal force will be greater in exactly the same proportion.

The critical phase of a turning movement at which tail swing or skidding usually occurs, is when the car begins to straighten out from its uniform movement in the curved path. The effect of turning the front wheels for the purpose of straightening out is to subject the car to an additional lateral force in the plane of the front wheels. A lateral shearing reaction exists between tire and ground due to centrifugal force and the direction of this new lateral force is such as to reduce this shearing reaction and therefore, the liability of the front wheels to sideslip.

In the case of the orthodox car, in which case $K^2$ is much less than $AB$, if a lateral force is applied to the front wheels, a lateral force acting in the opposite direction must simultaneously occur in the plane of the rear wheels. But since the direction of the component or centrifugal force is the same for both front and rear wheels, this latter force must increase the lateral shearing reaction in the plane of the rear wheels. If the car is already turning on a curved path with little margin or adhesion, this additional force probably will cause a definite sideslip or tail swing.

However, with the distribution of weight such that $AB=K^2$, no additional lateral force occurs in the plane of the rear wheels on turning into the straight from the curved path. In effect, the free motion of the car in space would be compounded of the uniform circular motion of the car in its original path with a swing or rotation of the car about a pivot in the plane of the rear wheels. Thus, in this case, so long as the conditions permit the car to turn in the uniform circular path without skidding, there will be no additional tendency, as in the case of the orthodox car, for skidding or tail swing as the car is straightened out again.

The other phase of motion is unimportant from this point of view, because although in this case the conditions are reversed and the dangerous increase of lateral force occurs this time on the front wheels, since the car is turning from the straight path into the curved, no initial lateral shearing force results from centrifugal action to reduce the available margin of adhesion.

It will, therefore, be seen that the optimum value $AB=K^2$ can be obtained with the center of gravity in that position which is most suitable for braking efficiency, so that all factors unite in pointing to the conclusion that the position of the largest individual weight, ordinarily that of the engine, must be behind the rear axle.

Other advantages of this disposition of the engine are its accessibility, the possibility of a low center of gravity owing to the elimination of the long propeller shaft, the removal of the noise, heat and odor of the engine as far as possible from the passengers, and the adaptability of such an engine disposition to use in conjunction with a streamline body.

According to the present invention, the engine, together with the clutch gear casing and differential, may form an integral structure, and such unitary structure is preferably so arranged that the engine is situated wholly or mainly behind the axis of the rear wheels, while the gear casing is positioned in front of such axis, especially where the engine is of the inline type. Broadly speaking, the elements mentioned are positioned relative to each other, and, as a whole, relative to the axis of the rear wheels to obtain a predetermined weight distribution, as above discussed, and the engine being ordinarily the heaviest and largest element of the unit, takes on this account a position behind the axis of the rear wheels.

With this disposition, substantially the entire space between the axes of the front and rear wheels is available for the passenger compartment so that the latter may occupy a position wherein it is most effectively supported by the springs for maximum riding comfort. A shorter wheel base for the vehicle, as a whole, is also made possible.

The invention is applicable to motor road vehicles of either the enclosed or open type, and in cases where the usual chassis and body framework is employed, the chassis members may be extended rearwardly of the axis of the rear wheels to provide a platform or support for the propelling means. However, in order to distribute the stresses due to this location of the propelling means, the chassis extension or supporting platform may be connected with a top structure including longitudinal frame members extending from the front to the rear of the car above the members of the chassis and connected by uprights with the chassis members, the whole constituting a truss-like frame. In this manner, stresses due to the location of the propelling means beyond the rear axle are distributed throughout the length of the framework of the vehicle.

Another object of the present invention is to provide an improved construction of motor road vehicle of this type wherein the construction and relative disposition of the parts of the driving unit with respect to the axis of the rear wheels is such as to render the unit readily dismountable or removable from the chassis without interfering with the rear road wheels or other portions of the vehicle, while at the same time, reducing as far as practicable the unsprung weight.

Another object of the present invention is to provide an improved construction of motor road vehicle having a rear engine drive wherein the overhang behind the rear axle is reduced to a minimum, and wherein provision is made for controlling the clutch and also, if desired, the gear box without the controls crossing the axis of the rear wheels, while also making provision for dismounting the clutch without disturbing the remainder of the installation.

According to one feature of the present invention, the engine, clutch, gear box and differential comprise a single driving or power unit, said unit being situated in the vicinity of the axis of the rear wheels, and the component parts of the said power unit being either located partly in front of the axis of the rear wheels and partly behind the axis of the rear wheels, or the power unit being situated wholly or mainly behind the axis of the rear wheels, the said rear wheels being provided with half axles (each half axle having a pair of universal joints, said axles being hereinafter referred to as articulated half axles), and the main bearings for the rear wheels or the supports therefor being interconnected by a transverse beam, with or without torque members.

According to one arrangement of the power unit relatively to the axis of the rear wheels, the engine (which may be a so-called "flat" engine with oppositely disposed cylinders, or else a vertical or V-shaped engine) is situated mainly or entirely behind the axis of the said rear wheels. In such cases the gear box, with or without the clutch, may be situated in front of the axis of the rear wheels. In other arrangements the engine may be situated in front of the axis of the rear wheels with the gear box and clutch located behind the said axis. In cases where a vertical engine is employed the engine may be transversely arranged (i. e., the axis thereof may be located parallel to the axis of the rear wheels), and the drive to the rear wheels may be effected through a worm and worm wheel, or its equivalent, the worm forming part of or being driven from the crank shaft of the engine, e. g., from one of the bearer members of the crank shaft suitably modified to act as a worm. According to another arrangement the engine, clutch and gear box forming the main components of the power unit may be situated behind the axis of the articulated half axles of the rear wheels, the main bearings for the rear wheels, or the supports therefor, being in this arrangement, interconnected by a transverse beam, with or without torque members, and each rear wheel having a separate spring. Two stub shafts extend laterally from the differential; the said stub shafts being in any suitable and readily removable manner connected to the half axles which constitute the final drive to the rear wheels, e. g., each stub shaft may carry one of the flanges of the universal joint forming part of the articulated half axle, or separate detachable flanges may be provided.

According to one embodiment of this feature of the present invention the transverse beam, or its equivalent, may be so constructed or arranged that it also comprises, or acts as a support for, separate torque members (which may also act as radius rods) and serves as a rigid connection between the articulated half axles of the rear wheels. In this embodiment of the invention each rear wheel may be independently sprung. Alternatively, the axle beam may be constructed without separate torque members and so arranged that its acts as a rigid connection between the supports for the main axle bearings of the rear wheels, in which case the axle beam not only controls the action of the springs, but also acts as a combined torque and radius rod. In the last mentioned embodiment of the invention two separate springs are provided, the axle beam serving, as aforesaid, to control the movement of the said springs.

According to another feature of the present invention, front and rear end cross members are provided extending between the longitudinal frame members of the chassis, a pair of stub shafts being also provided extending laterally from the differential and being detachably connected to the articulated half axles; flanges, or their equivalent, being provided both at the front and rear of the power unit, and the power unit being detachably secured by bolts or otherwise to the cross frame members.

The chief advantage of any of the aforesaid constructions of driving units consists in the fact that, apart from the unsprung weight being reduced to the minimum, the entire driving unit can be readily disconnected from the frame or chassis of the car without interfering either with the rear wheels or with the independent or separate springs provided therefor.

According to another feature of the present invention, the engine is mounted wholly or mainly behind the axis of the rear wheels, and in front of the engine the rear axle and differential drive are located, the gear box being situated on the forward side of the back axle and the clutch being located in front of the gear box. The drive from the engine is taken through a hollow worm shaft to the gear box and clutch, the said hollow worm shaft engaging with the worm wheel which drives the differential.

In cases where the clutch is situated in front of the gear box, the advantages of this particular arrangement of the driving mechanism are (1) the overall length of the power plant, behind the back axle is reduced to a minimum; (2) as the clutch is situated in front of the gear box, it can be dismounted for examination or repair without interference with any other part of the installation; (3) the clutch control, as also the change speed controls, can be taken from the forward control position to the clutch and gear box directly and without passing over the back axle, thus simplifying the clutch and gear box controls.

According to a further feature of the present invention, an engine of the horizontal type with opposed cylinders is provided and mounted wholly or mainly behind the axis of the rear wheels, the gear box being situated in front of the axis of the rear wheels.

The engine may be either water cooled or air cooled, and if water cooled, and according to this feature of the present invention, the radiator can be placed immediately over the front center portion of the engine, which, with a horizontal engine, allows a smooth contour of the framework of the car at the rear end thereof. If the engine is air cooled the blower utilized for forcing air over the cylinder heads and cooling the engine can be mounted in the same place normally occupied by the radiator in a water cooled engine. With the horizontal type of engine the center of gravity of the engine is lower as compared with the vertical engine.

Embodiments of the invention will be more specifically described in connection with the accompanying drawings, in which.

It will be understood that the several views of the drawings are more or less diagrammatic, and, while they illustrate arrangements that have been demonstrated to be very efficient, there can, of course, be considerable modification and change in the details shown without departing from the invention. The drawings are intended to be merely illustrative and not restrictive of the invention which fundamentally involves broadly an operative disposition of the propelling means at the rear end of an automotive vehicle, and, more specifically, such disposition as to obtain a center of gravity for the vehicle, as a whole, as was discussed at the outset.

Referring to the drawings, the motor road vehicle illustrated includes a chassis 1 and a body 2, the latter being shown as of the enclosed type and as including a stream line outer covering as described more in detail in the original application, Serial No. 384,946.

Figure 2:
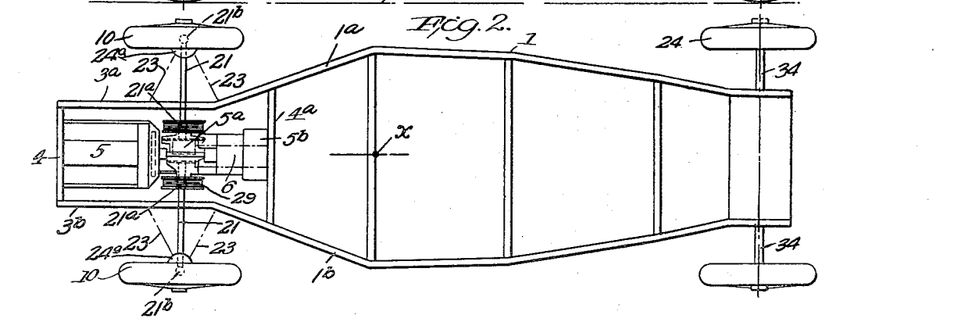
Figure 2 is a plan of the chassis of such vehicle.

The chassis includes main longitudinal members 1ª and 1ᵇ sprung at their forward ends on front steering wheels 24, the springs being designated at 34, Figure 2. In the vicinity of the axis of the rear wheels 10, the longitudinal members are mutually approached and have extensions 3ª and 3ᵇ projecting rearwardly of said axis. At their rear ends, the extensions 3ª and 3ᵇ are connected by a transverse frame member 4, while forwardly of the axis of the rear wheels 10 the longitudinal members are connected by a transverse member 4ª. These transverse members are utilized as supporting means for the propelling means, which includes an engine 5, differential 5ª, speed change gearing 6 and clutch 5ᵇ, constituted as a unitary structure and, as here shown, aligned in the order just named. This unitary structure has its longitudinal axis disposed longitudinally of the vehicle and preferably horizontally with the engine in symmetrical relation to the rear wheels and the ends of the structure secured to the cross members 4 and 4ª. The propulsion unit is also disposed with a view to obtaining a low center of gravity and, with an in-line engine of the type shown, the engine axis preferably occupies a horizontal position. Since the invention is not confined to any particular type of engine, however, it will be understood that with other types of engine and even with the illustrated in-line type, considerations of road clearance, and the like, may make it desirable to incline the engine axis more or less.

Figure 1:
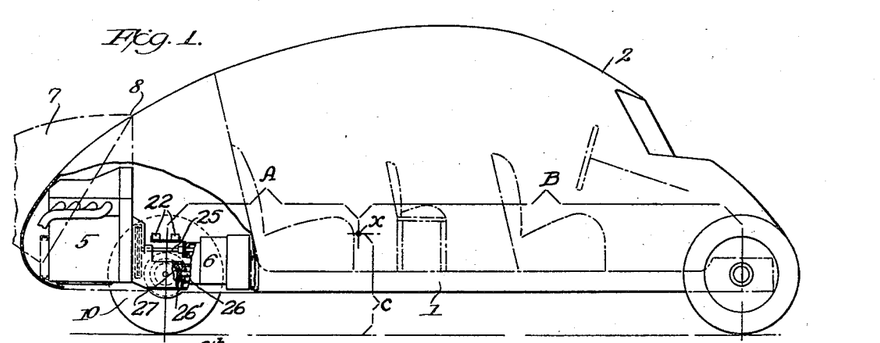
Figure 1 is a side elevation of a motor road vehicle having its parts arranged in accordance with the present invention.

Fundamentally, it will be understood that the invention is not limited as regards details of the power transmitting means, and for this reason, the clutch, gear change mechanism, and differential have not been shown in detail. In Figures 1 and 2, reference numeral 25 designates a drive shaft extending between the engine 5 and clutch mechanism $5^b$, while reference numeral 26 designates the terminal driven shaft of the speed change mechanism 6, the shaft 26 having a bevel pinion 26' at its extremity engaging the ring gear 27 of differential gearing 28, Figure 4.

Figure 4:
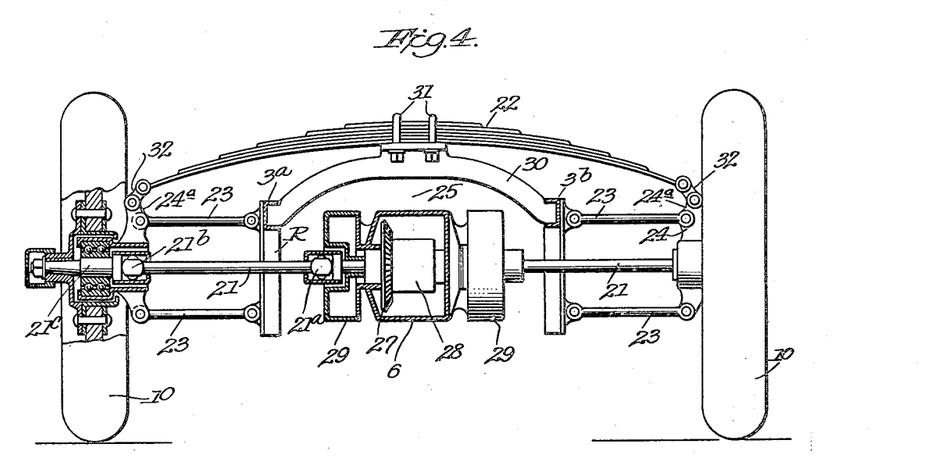
Figure 4 is a transverse section of a vehicle embodying the invention, the section being taken substantially in the vertical plane of the axis of the rear wheels.
Figure 5:
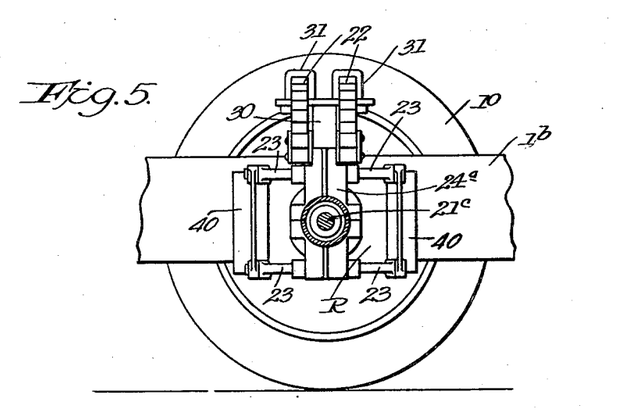
Figure 5 is an elevation of the portion of the vehicle frame in the vicinity of the axis of the rear wheels, the rear wheel being removed and the axle shown in section.

Referring to Figures 1, 2, 4 and 5, drive from the differential to the rear wheels is effected by the independent shafts 21 which are universally jointed at points $21^a$ and $21^b$, respectively adjacent the differential housing and the rear wheels, the shafts extending freely through recesses as at R, Figures 4 and 5, in the longitudinal members of the chassis frame. If desired, brake drums 29 may be fixed on the rigid shaft sections between joints $21^a$ and the differential housing.

Springs 22 are interposed between the chassis and rear wheels, as most clearly shown in Figures 4 and 5. The springs extend transversely of the vehicle and are connected to the chassis elements $3^a$ and $3^b$ through a saddle member 30 which connects the latter, the springs being bolted at their medial portions to the saddle member through U-bolts 31. The outer ends of the springs are connected through shackles 32 to blocks or frames $24^a$ in which the rigid end portions $21^c$ of shafts 21 are journaled, the wheels 10 being keyed on the extremities of such rigid end portions. Upper and lower pairs of arms 23 are pivoted at their outer ends to the top and bottom of blocks $24^a$ and diverge inwardly, in horizontal planes, to brackets as at 40, to which their inner ends are pivotally connected, all of the described pivoting arm axes being substantially horizontal and extending longitudinally of the vehicle, the upper and lower arms being substantially parallel so that the wheels 10 are maintained in their normal upright position under all flexing conditions of springs 22.

From the above, it will be evident that the propelling means is sprung weight, and that in all springing relations of the chassis to the wheels the articulated shafts 21 are effective to drive the latter. The universal joints are such as to permit adequate extension and contraction of shaft 21 necessitated by the parallelogram frames in their oscillatory movements. The described arrangement of parts and driving means for the rear wheels, including the articulated drive shafts necessitated by the independent springing of the wheels and conventionally illustrated in Figures 1 and 2, are the same as disclosed in my said original U. S. application, Serial No. 384,946.

As shown in Figures 1 and 2, the clutch $5^b$ and speed change gearing 6 are on the opposite side of the axis of the rear wheels from the engine 5, this being assumed, for the purpose of illustration, to be essential in securing a weight distribution such that the center of gravity X is substantially one-third the length of the wheel base in front of the axis of the rear wheels, this distance being that of the bracket A, Figure 1. The bracket B represents that portion of the wheel base length between the axis of the front wheels and the center of gravity. The distance from the center of gravity to the ground is designated by the bracket C, and is substantially one-sixth of the wheel base length. Since under maximum braking, the point X moves forward substantially the distance C, the proper equation for safety braking, $A$ plus $C = B$ minus $C$, results.

As has been pointed out above, if maximum riding comfort is to be secured, the product of the wheel base portions A and B should equal $K^2$, K being the radius of gyration about the point X and the illustrated arrangement of the propelling means makes possible the attainment or substantial attainment of this equation. While the exact fulfillment of the equation is desirable with the center of gravity at a point one-third of the length of the wheel base at the front of the axle, some departure from this exact point is permissible in either longitudinal direction without grave impairment in result. Accordingly, the invention in its more specific aspect contemplates such a weight distribution as to position the center of gravity of the vehicle, as a whole, substantially from 25 to 45% of the length of the wheel base in front of the axis of the rear wheels with AB equal to $K^2$.

With the present day type of in-line engines, I have found that the requirements of weight distribution are best satisfied with the clutch and gear change on the opposite side of the axis of the rear wheels from the engine, so that this relative disposition of the parts appears at present to be preferable. Under the broad aspect of the invention, however, any other relative arrangement of these parts is contemplated in the attainment of the proper weight distribution in satisfaction of the considerations which have been discussed.

An advantage exists in the disposition of the gear box and clutch in advance of the axis of the rear wheels, in that the control rods or wires for the same, leading from the controls in the driver's compartment, are shorter than would otherwise be possible. The engine in its rearward disposition is readily accessible upon lifting a hood or enclosure 7 pivoted at its upper end on a transverse axis 8, Figures 1 and 3.

Figure 3:
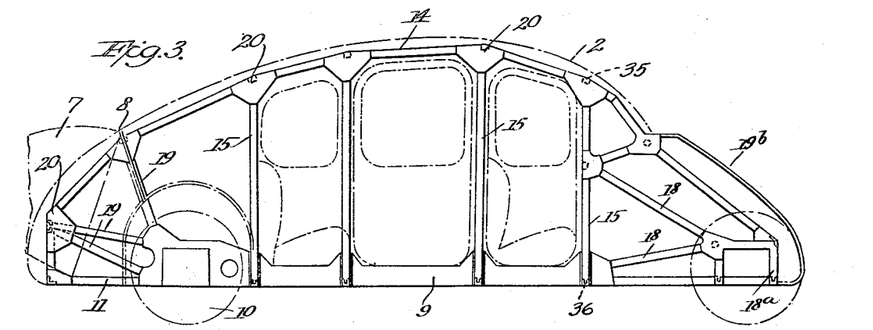
Figure 3 is an elevation of the framework of the vehicle, the covering of the body being shown in dotted lines.

A desirable form of construction is shown in Figure 3, wherein a unitary body frame and chassis is shown. According to this showing, the chassis comprises lower longitudinal members, as at 9, continued rearwardly beyond the axis of the rear wheels to form side elements as at 11 of a mounting platform for the propulsion mechanism or a portion thereof. Upper longitudinal members as at 14 extend over the longitudinal members 9 and are connected to the members 9 at each side of the vehicle by uprights or compression members as at 15. As shown in dotted lines, the doors and windows of the car are arranged in the spaces between such uprights.

The uprights 15 at opposite sides of the car are connected by suitable transverse frame members at the top and bottom, the ends of these transverse members being indicated in dotted lines at 35 and 36, Figure 3, said transverse members and uprights constituting ring-like frames between the chassis members 9 and the top frame members 14. The upper transverse members with the members 14 serve to support the roof of the body, while the lower transverse connecting members support the floor. The several frame and connecting members are suitably riveted together or otherwise connected to form a rigid structure, suitable gusset plates as at 20 being provided if desired. The several members and framework are preferably of hollow metal which is rectangular in cross-section, although any desired and appropriate shapes may be used.

At the forward end of the body frame are arranged inclined members 18 which serve as supports for the front axle, if a single axle is employed, and also as a support for a box-like structure $18^a$ which may be used as a battery container or for other purposes. The members 18 may also support the bearings for the front wheel axles if independent axles are provided. Inclined and curved members $19^b$ constitute supports for a pivoted cowling at the extreme forward end of the vehicle.

Between the rearward extensions of the chassis members 9 and the rear of frame members 14 are arranged inclined compression members 19, and it will be seen that, by this construction, the weight of the engine is distributed over the frame of the vehicle from the rear to the front thereof, members 14, the lower longitudinal frame members, and the compression members being in truss-like association.

Preferably, as shown, the framework of the vehicle is enclosed within an outer covering which present substantially an unbroken stream line shape from the front to the rear, and such covering preferably includes all the main protuberances with the exception, as here shown, of the front wheels.

Figure 6:
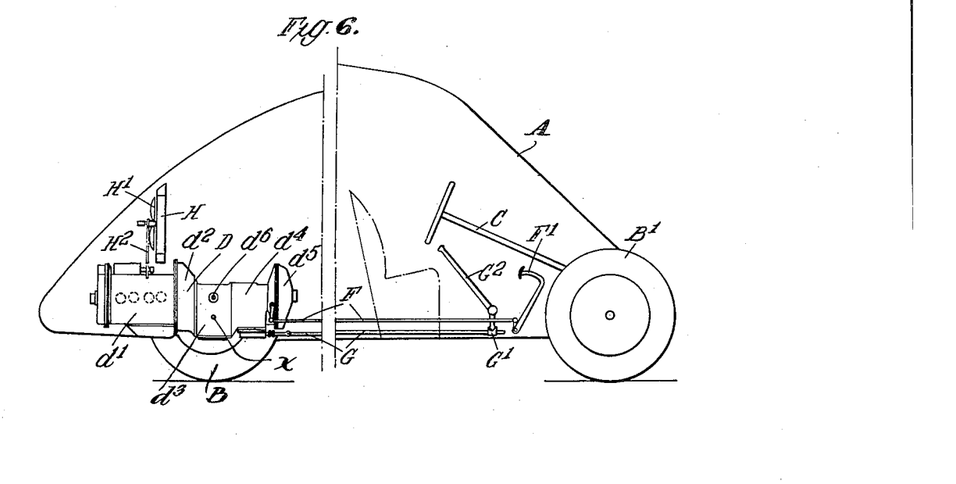
Figure 6 is a diagrammatic elevation of a motor road vehicle of streamline form showing a modified arrangement.
Figure 7:
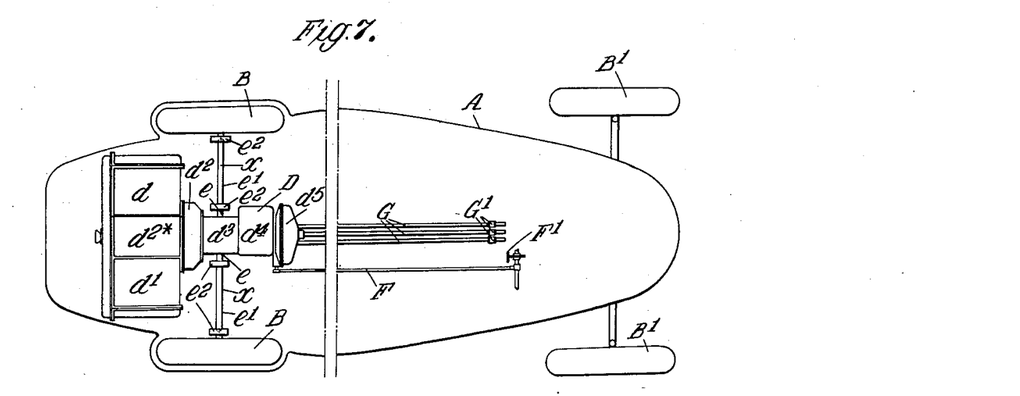
Figure 7 is a plan view of the vehicle of Figure 6 with certain non-essential features omitted.
Figure 8:
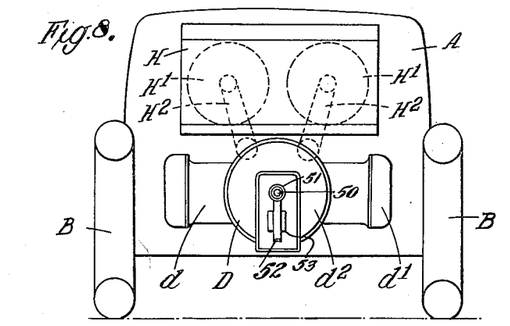
Figure 8 is a sectional end view of the vehicle of Figure 6, the section being taken through the axis of the rear wheels.
Figure 9:
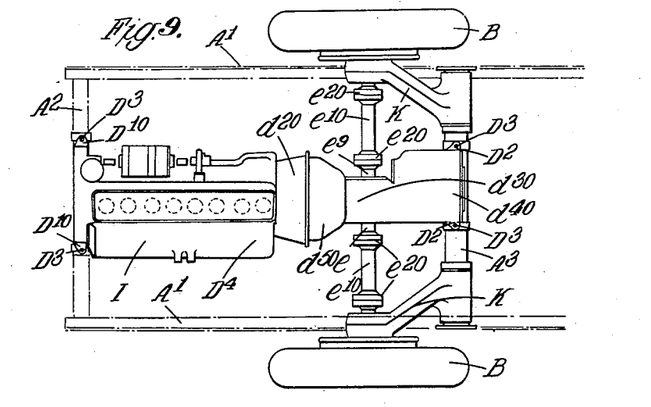
Figure 9 is a plan view of the rear portion of a motor road vehicle showing a further modified arrangement.

Referring now to the arrangements shown in Figures 6 to 17, in Figures 6, 7 and 8, A is the streamlined body portion of the car; B, B are the rear road wheels and B', B' the front road wheels. C is the steering wheel and D is the driving or power unit situated at the rear of the vehicle. In this embodiment of the invention, the said power unit comprises an eight-cylinder engine of the horizontal type, having opposed cylinders, the engine being situated mainly or entirely behind the axis $x$ of the rear wheels B, B, and comprising a near-side engine block $d$ and an off-side engine block $d'$, the crank case $d^{2x}$ being situated between the engine block $d$ and $d'$. $d^2$ is the casing containing the fly-wheel; $d^3$ is a casing containing a worm, worm wheel and differential. $d^4$ is the gear box and $d^5$ the clutch. The drive from the engine is taken by means of a shaft 50, Figure 8, through a hollow worm shaft 51 to the gear box and clutch, returning by way of said hollow worm shaft to the worm wheel 52 which drives the differential 53. The drive between the engine and the clutch may be a spline drive, for example, a ball spline. $e, e$, are stub shafts extending laterally from the differential 53 and forming part of the pair of articulated half axles $e', e'$, each half axle $e', e'$ being provided with a pair of universal joints $e^2, e^2$. In this embodiment of the invention, each rear wheel may be provided either with separate springs or the wheels may be independently sprung. The power unit D may be connected to the chassis in any suitable manner; for example, a transverse tubular member (not shown) may be provided extending between and interconnecting the longitudinal frame members of the chassis, and depending hangers (not shown) may also be provided attached at their upper ends to the said tubular member, and at their lower ends to supports $d^6$ on the worm and differential casing $d^3$. This method of supporting the power unit may be employed with or without the transverse beam (provided with or without torque members) hereinafter more particularly described with reference to the other embodiments of the invention illustrated in Figures 9 to 17.

F is the clutch wire; F' is the clutch pedal, and G, G, are the change speed rods with their selector forks G', G', and change speed lever $G^2$. H is the radiator, and H', H' are fans driven by means of belts or chains $H^2$, $H^2$.

Figure 10:
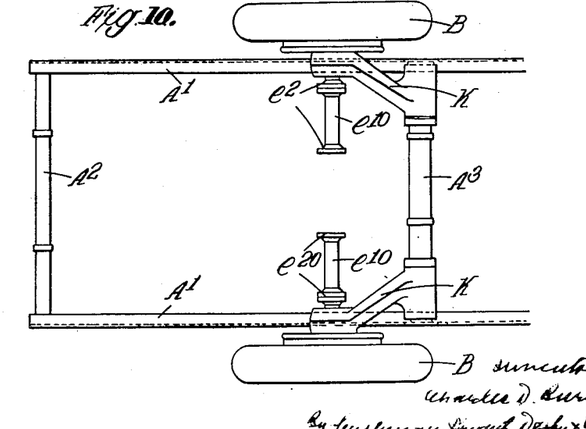
Figure 10 is a view similar to that of Figure 9 showing the vehicle chassis with the power unit removed therefrom.
Figure 11:
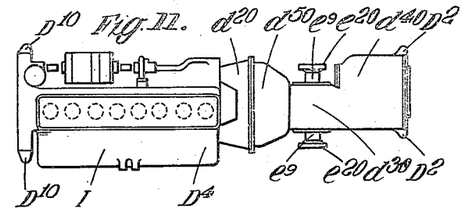
Figure 11 is a plan view of the removed power unit.

Referring to Figures 9 to 13, I is a vertical engine forming part of the power unit D⁴. $d^{20}$ is the casing containing the fly-wheel. $d^{50}$ is the clutch; $d^{30}$ is a casing containing the differential, and $d^{40}$ is the gear box, $e^9$, $e^9$, the the stub shafts from the differential; $e^{20}$, $e^{20}$, are the universal couplings forming part of the articulated half axles $e^{10}$, $e^{10}$; $e^{30}$ (Figure 13) is a flange coupling with which each articulated half axle may also be provided, if desired. B, B are the rear road wheels; A', A' are the longitudinal frame members of the chassis; A² is a rear cross member and A³ a front cross member extending between the frame members A', A' of the chassis, and K, K are the torque members. The driving unit is provided at its rear end with flanges $D^{10}$, $D^{10}$ and at its front end with flanges $D^2$, $D^2$. By disconnecting the holding down bolts $D^3$, $D^3$ from the said flanges and also unbolting one or other of the universal couplings $e^{20}$ provided on each half axle, or, alternatively, the flange coupling $e^3$ shown at Figure 13, the entire driving unit can be readily removed from the chassis, as shown in Figures 10 and 11.

Figure 12:
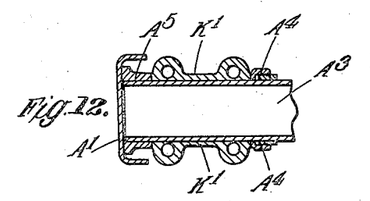
Figure 12 is a sectional view on line 12—12 of Figure 14.
Figure 13:
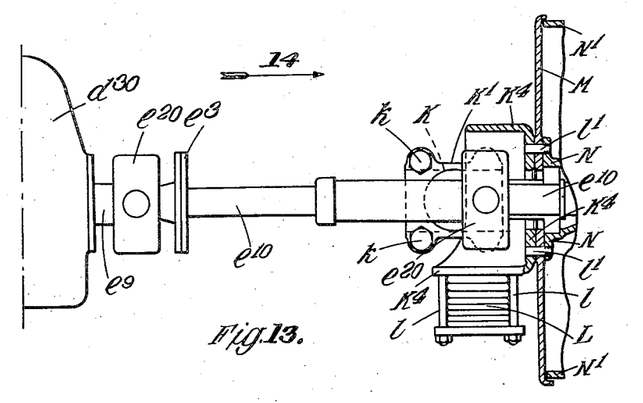
Figure 13 is an elevation, partly in section, showing the drive connection between the differential and a rear wheel as in Figure 9.
Figure 14:
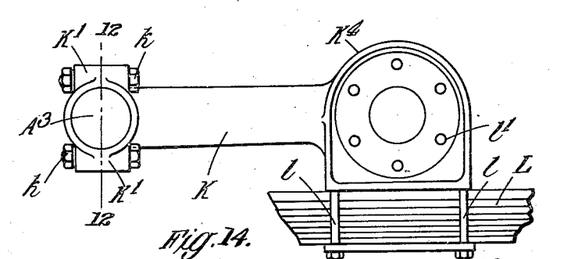
Figure 14 is an elevation of certain parts shown in Figure 13, looking in the direction of the arrow 14.

Referring more particularly to Figures 12, 13, and 14, each torque arm K is attached at one end to a wheel bracket K⁴ and at its other end it is rotatably mounted on the cross member A³ by means of a two part sleeve K' the parts of which are connected together by bolts $k, k$. A⁴ is a bearing and A⁵ is a flange on the cross arm A³, situated between the sleeve K' and the longitudinal frame member A'. The wheel bracket K⁴ is secured to the road springs L by bolts $l, l$, and the said wheel bracket K⁴ carries by means of studs $l', l'$ the brake torque plate M, as also the fixed hub N. N' is part of the brake drum shown fully at the right hand side of Figure 16. The springs L may be the usual longitudinally extending semi-elliptic springs pivoted at their forward ends to the frame with their rear ends connected to the frame through the usual shackles.

Figure 15:
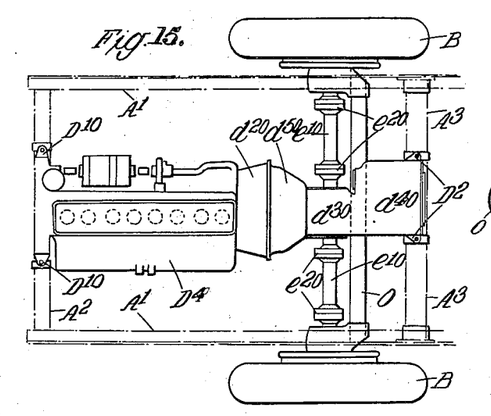
Figure 15 is a plan view of the rear portion of a motor road vehicle showing a further modified arrangement.
Figure 16:
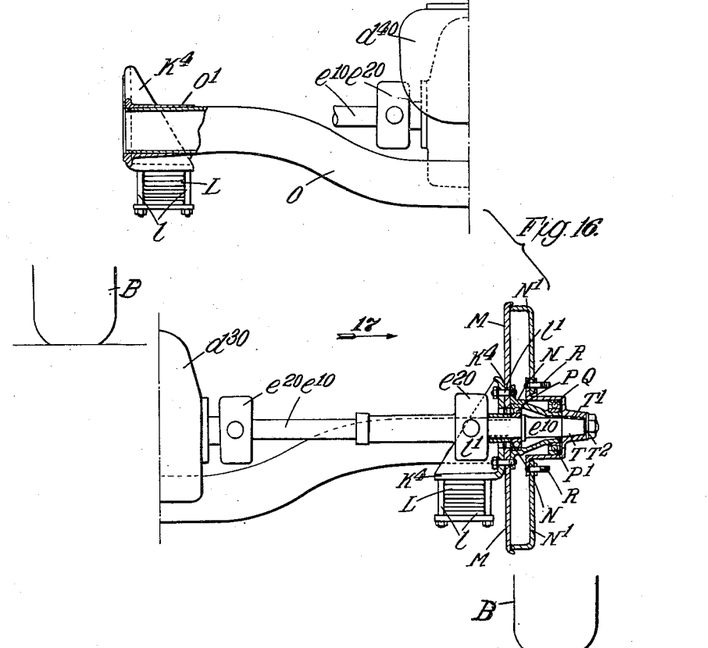
Figure 16 is a composite view showing in elevation and in section the wheel driving and wheel supporting means shown in Figure 15, the portion at the left of the center line being taken partly on line 16—16 of Figure 17 looking toward the rear of the vehicle and the portion at the right of the center line being taken partly on line 16'—16' of Figure 17 looking toward the front of the vehicle.
Figure 17:
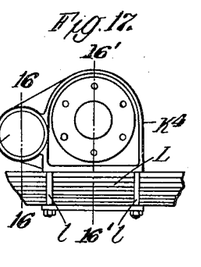
Figure 17 is an elevation of certain parts shown in Figure 16 looking in the direction of the arrow 17.

Similar reference letters to those employed in Figures 12, 13, and 14 have been used to designate the parts of the engine unit and the articulated half axle described with reference to Figures 15, 16 and 17. In this embodiment of the invention, however, and in place of torque members K, K an axle beam O is employed, and the driving unit is bolted down at its front end to a transverse beam A³ as described with reference to Figures 12, 13 and 14. The axle beam O is fixed by brazing or similar means into a socket O' formed integral with the wheel bracket K⁴. The wheel bracket is secured to the road springs L, L by the studs $l, l$, so that the weight of the car is carried directly by the wheel bracket K⁴, the tubular axle beam O being employed only to resist the bending moment and to control the movement of the springs L, L. The wheel bracket K⁴ carries by means of the studs $l', l'$, the torque plate M and the fixed hub N. The fixed hub carries the bearings P and P'. The bearing P carries the weight of the car through the rotating hub Q, the studs R, R and the wheels B, B, part only of which is shown in this view. The bearing P fulfills the combined function of preventing the wheel from tilting through the medium of the driving shaft T, to which the rotating hub Q is secured by the taper and key T' and the nut T². The studs R, R, besides acting as the combined attachment for the detachable wheel hub and transmitting the driving torque thereto, also serve to secure the brake drum N' to the rotating hub Q.

The framework of the car is preferably of streamline form and is constructed as described hereinbefore with reference to Figure 3, a hinged or removable cover being provided at the rear of the car so as to render the engine readily accessible.

Each road wheel may have an independent brake and an independent mud guard and the track of the front wheels may be wider than the track of the rear wheels. In the latter case the upper structure of the car may enclose the rear wheels, thus dispensing with the necessity of providing independent mud guards.

Where a horizontal engine is employed situated behind the axis of the rear wheels instead of a vertical engine a much larger back window can be fitted in cases where the framework of the car is of streamline form as the height of the engine block is less in cases where a horizontal engine is employed than is the case with a vertical engine. Furthermore, the use of a horizontal engine in place of a vertical engine prevents interference with the streamline shape at the rear of the car.

It is to be understood, however, that, as aforesaid, a vertical engine or a V-shaped engine may also be employed with the other features of the drive.

It is also to be understood that in all embodiments of the present invention the drive is taken from the engine to the axis of the rear wheels in a horizontal or substantially horizontal plane so as to keep the center of gravity low and to reduce rolling moment to the minimum.

In cases where the engine is situated on one side of the axis of the rear wheels and the gear box on the other, so-called "tail swing" is also reduced to a minimum.

It will be evident that the invention is susceptible of varied embodiments without departure from its scope, and accordingly, I do not limit myself to structure, except as in the following claims.

I claim:—

1. A motor road vehicle of the kind set forth, said vehicle comprising a body frame, front and rear pairs of wheels, spring means interposed between the frame and wheels for supporting the frame on the wheels, the frame having a rearward extension beyond the axis of the rear wheels, an engine supported by said frame extension entirely behind the axis of the rear wheels; and means for transmitting power from the engine to the rear wheels comprising a clutch, speed change gearing, and differential gearing all supported by the frame with the differential gearing substantially in the axis of the rear wheels; the engine and power transmitting means being closely associated to form a compact group extending longitudinally of the vehicle, the center of gravity of the said group being to the rear of the axis of the rear wheels but closely adjacent thereto so as to favorably affect the attainment of a center of gravity for the vehicle as a whole a substantial distance in advance of said axis, said power transmitting means also including universally jointed drive shafts connecting the differential gearing and rear wheels and operative in all springing relations of the frame to the wheels.

2. A motor road vehicle of the kind set forth, said vehicle comprising a body frame, front and rear pairs of wheels, spring means interposed between the frame and wheels for supporting the frame on the wheels, the frame having a rearward extension beyond the axis of the rear wheels, an engine supported by said frame extension entirely behind the axis of the rear wheels, said engine being disposed with a view to obtaining a low center of gravity for the vehicle and with its longitudinal axis extending longitudinally of the vehicle in substantially symmetrical relation to the rear wheels; and means for transmitting power from the engine to the rear wheels comprising a clutch, speed change gearing, and differential gearing all supported by the frame with the differential gearing substantially in the axis of the rear wheels and substantially midway between said rear wheels; the engine and power transmitting means being closely associated to form a compact group extending longitudinally of the vehicle, the center of gravity of the said group being to the rear of the axis of the rear wheels but closely adjacent thereto so as to favorably affect the attainment of a center of gravity for the vehicle as a whole a substantial distance in advance of said axis, said power transmitting means also including universally jointed drive shafts connecting the differential gearing and rear wheels and operative in all springing relations of the frame to the wheels.

3. A motor road vehicle of the kind set forth, said vehicle comprising a body frame, front rear pairs of wheels supporting said frame, yieldable means supporting the frame on the rear wheels; an engine, clutch, change speed gear box and differential constituting a unit structure with the differential located between the engine and gear box, said unit structure being supported in substantially horizontal position on the frame and extending longitudinally of the latter with the differential substantially in the axis of the rear wheels and the engine and gear box on opposite sides of said axis; and universally jointed, independently pivoting drive shafts connecting the differential and rear wheels.

4. A motor road vehicle of the kind set forth, said vehicle comprising a body frame, front and rear pairs of wheels supporting said frame, yieldable means supporting the frame on the rear wheels; an engine, clutch, change speed gear box and differential constituting a unit structure with the differential located between the engine and gear box, said unit structure being supported in substantially horizontal position on the frame and extending longitudinally of the latter with the engine entirely to the rear of the axis of the rear wheels, the gear box in front of said axis, and the differential substantially in said axis; and universally jointed, independently pivoting drive shafts connecting the differential and rear wheels.

5. A motor road vehicle comprising a body frame, front and rear pairs of wheels, spring means interposed between the frame and wheels for supporting the frame on the wheels, the frame having a rearward extension beyond the axis of the rear wheels, an engine supported by said frame extension behind the axis of the rear wheels, and means for transmitting power from the engine to the rear wheels mounted on the frame and in connection with the rear wheels, said engine and power transmitting means being so disposed as to position the center of gravity of the vehicle substantially from 25 to 45% of the length of the wheel base in front of the axis of the rear wheels.

6. A motor road vehicle comprising a body frame, front and rear pairs of wheels, spring means interposed between the frame and wheels for supporting the frame on the wheels, the frame having a rearward extension beyond the axis of the rear wheels, an engine supported by said frame extension behind the axis of the rear wheels, and means for transmitting power from the engine to the rear wheels mounted on the frame and in connection with the rear wheels, the disposition of the engine and power transmitting means effecting a weight distribution for the vehicle as a whole such that the product of the wheel base portions fore and aft the center of gravity substantially equals the square of the radius of gyration about the center of gravity.

7. A motor road vehicle comprising a body frame, front and rear pairs of wheels, spring means interposed between the frame and wheels for supporting the frame on the wheels, the frame having a rearward extension beyond the axis of the rear wheels, an engine supported by said frame extension behind the axis of the rear wheels, and means for transmitting power from the engine to the rear wheels mounted on the frame and in connection with the rear wheels, the disposition of the engine and power transmitting means being such as to position the center of gravity of the vehicle substantially from 25 to 45% of the length of the wheel base in front of the axis of the rear wheels with the product of the wheel base portions fore and aft of the center of gravity substantially equal to the square of the radius of gyration about the center of gravity.

8. A motor road vehicle of the kind set forth, said vehicle comprising a body frame, front and rear pairs of wheels, spring means interposed between the frame and wheels for supporting the frame on the wheels, the frame having a rearward extension beyond the axis of the rear wheels, an engine supported by said frame extension entirely behind the axis of the rear wheels, said engine being disposed with a view to obtaining a low center of gravity for the vehicle and with its longitudinal axis extending longitudinally of the vehicle in substantially symmetrical relation to the rear wheels; and means for transmitting power from the engine to the rear wheels comprising a clutch, speed change gearing, and differential gearing all supported by the frame with the differential gearing substantially in the axis of the rear wheels and substantially midway between said rear wheels; the disposition of the engine and said power transmitting elements being such as to position the center of gravity of the vehicle substantially from 25 to 45% of the length of the wheel base in front of the axis of the rear wheels, said power transmitting means also including universally jointed drive shafts connecting the differential gearing and rear wheels and operative in all springing relations of the frame to the wheels.

9. A motor road vehicle of the kind set forth, said vehicle comprising a body frame, front and rear pairs of wheels, spring means interposed between the frame and wheels for supporting the frame on the wheels, the frame having a rearward extension beyond the axis of the rear wheels, an engine supported by said frame extension entirely behind the axis of the rear wheels, said engine being disposed with a view to obtaining a low center of gravity for the vehicle and with its longitudinal axis extending longitudinally of the vehicle in substantially symmetrical relation to the rear wheels; and means for transmitting power from the engine to the rear wheels comprising a clutch, speed change gearing, and differential gearing all supported by the frame with the differential gearing substantially in the axis of the rear wheels and substantially midway between said rear wheels; the disposition of the engine and said power transmitting elements being such as to effect a weight distribution for the vehicle as a whole such that the product of the wheel base portions fore and aft of the center of gravity substantially equals the square of the radius of gyration about the center of gravity, said power transmitting means also including universally jointed drive shafts connecting the differential gearing and rear wheels and operative in all springing relations of the frame to the wheels.

10. A motor road vehicle of the kind set forth, said vehicle comprising a body frame, front and rear pairs of wheels, spring means interposed between the frame and wheels for supporting the frame on the wheels, the frame having a rearward extension beyond the axis of the rear wheels, an engine supported by said frame extension entirely behind the axis of the rear wheels, said engine being disposed with a view to obtaining a low center of gravity for the vehicle and with its longitudinal axis extending longitudinally of the vehicle in substantially symmetrical relation to the rear wheels; and means for transmitting power from the engine to the rear wheels comprising a clutch, speed change gearing, and differential gearing all supported by the frame with the differential gearing substantially in the axis of the rear wheels and substantially midway between said rear wheels; the disposition of the engine and said power transmitting elements being such as to position the center of gravity of the vehicle substantially from 25 to 45% of the length of the wheel base in front of the axis of the rear wheels with the product of the wheel base portions fore and aft of the center of gravity substantially equal to the square of the radius of gyration about the center of gravity.

11. A motor road vehicle of the kind set forth, said vehicle comprising a body frame, front and rear pairs of wheels supporting said frame, yieldable means supporting the frame on the rear wheels; an engine, clutch, change speed gear box and differential constituting a unit structure with the differential located between the engine and gear box, said unit structure being supported in substantially horizontal position on the frame and extending longitudinally of the latter with the differental substantially in the axis of the rear wheels and the engine and gear box on opposite sides of said axis; the disposition of said unit structure being such as to position the center of gravity of the vehicle substantially from 25 to 45% of the length of the wheel base in front of the axis of the rear wheels, and universally jointed, independently pivoting drive shafts connecting the differential and rear wheels.

12. A motor road vehicle of the kind set forth, said vehicle comprising a body frame, front and rear pairs of wheels supporting said frame, yieldable means supporting the frame on the rear wheels; an engine, clutch, change speed gear box and differential constituting a unit structure with the differential located between the engine and gear box, said unit structure being supported in substantially horizontal position on the frame and extending longitudinally of the latter with the differential substantially in the axis of the rear wheels and the engine and gear box on opposite sides of said axis; the disposition of said unit structure effecting a weight distribution for the vehicle as a whole such that the product of the wheel base portions fore and aft of the center of gravity substantially equals the square of the radius of gyration about the center of gravity, and universally jointed, independently pivoting drive shafts connecting the differential and rear wheels.

13. A motor road vehicle of the kind set forth, said vehicle comprising a body frame, front and rear pairs of wheels supporting said frame, yieldable means supporting the frame on the rear wheels; an engine, clutch, change speed gear box and differential constituting a unit structure with the differential located between the engine and gear box, said unit structure being supported in substantially horizontal position on the frame and extending longitudinally of the latter with the differential substantially in the axis of the rear wheels and the engine and gear box on opposite sides of said axis; the disposition of said unit structure being such as to position the center of gravity of said vehicle from 25 to 45% of the length of the wheel base in front of the axis of the rear wheels with the product of the wheel base portions fore and aft of the center of gravity substantially equal to the square of the radius of gyration about the center of gravity.

14. A motor road vehicle of the kind set forth, said vehicle comprising a body frame, front and rear pairs of wheels supporting said frame, yieldable means supporting the frame on the rear wheels; an engine, clutch, change speed gear box and differential constituting a unit structure with the differential located between the engine and gear box, said unit structure being supported in substantially horizontal position on the frame and extending longitudinally of the latter with the engine entirely to the rear of the axis of the rear wheels, the gear box in front of said axis, and the differential substantially in said axis; the disposition of said unit structure being such as to position the center of gravity of the vehicle substantially from 25 to 45% of the length of the wheel base in front of the axis of the rear wheels, and universally jointed, independently pivoting drive shafts connecting the differential and rear wheels.

15. A motor road vehicle of the kind set forth, said vehicle comprising a body frame, front and rear pairs of wheels supporting said frame, yieldable means supporting the frame on the rear wheels; an engine, clutch, change speed gear box and differential constituting a unit structure with the differential located between the engine and gear box, said unit structure being supported in substantially horizontal position on the frame and extending longitudinally of the latter with the engine entirely to the rear of the axis of the rear wheels, the gear box in front of said axis, and the differential substantially in said axis; the disposition of said unit structure effecting a weight distribution for the vehicle as a whole such that the product of the wheel base portions fore and aft of the center of gravity substantially equals the square of the radius of gyration about the center of gravity, and universally jointed, independently pivoting drive shafts connecting the differential and rear wheels.

16. A motor road vehicle of the kind set forth, said vehicle comprising a body frame, front and rear pairs of wheels supporting said frame, yieldable means supporting the frame on the rear wheels; an engine, clutch, change speed gear box and differential constituting a unit structure with the differential located between the engine and gear box, said unit structure being supported in substantially horizontal position on the frame and extending longitudinally of the latter with the engine entirely to the rear of the axis of the rear wheels, the gear box in front of said axis, and the differential substantially in said axis; the disposition of said unit structure being such as to position the center of gravity of said vehicle from 25 to 45% of the length of the wheel base in front of the axis of the rear wheels with the product of the wheel base portions fore and aft of the center of gravity substantially equal to the square of the radius of gyration about the center of gravity.

17. A motor road vehicle of the kind set forth, said vehicle comprising a body frame, front and rear pairs of wheels supporting said frame, yieldable means supporting the frame on the rear wheels, the frame having a rearward extension beyond the axis of the rear wheels, an engine supported by said frame extension entirely behind the axis of the rear wheels; and means for transmitting power from the engine to the rear wheels comprising a clutch, speed change gearing, and differential gearing all supported by the frame with the differential gearing substantially in the axis of the rear wheels and the speed change gearing in advance of said axis; said power transmitting means also including universally jointed drive shafts connecting the differential gearing and rear wheels and operative in all springing relations of the frame to the wheels.

18. A motor road vehicle of the kind set forth, said vehicle comprising a body frame, front and rear pairs of wheels supporting said frame, yieldable means supporting the frame on the rear wheels, the frame having a rearward extension beyond the axis of the rear wheels, an engine supported by said frame extension entirely behind the axis of the rear wheels; and means for transmitting power from the engine to the rear wheels comprising a clutch, speed change gearing, and differential gearing all supported by the frame with the differential gearing substantially in the axis of the rear wheels and the speed change gearing in advance of said axis; the disposition of the engine and said power transmitting elements being such as to position the center of gravity of the vehicle substantially from 25 to 45% of the length of the wheel base in front of the axis of the rear wheels, said power transmitting means also including universally jointed drive shafts connecting the differential gearing and rear wheels and operative in all springing relations of the frame to the wheels.

19. A motor road vehicle of the kind set forth, said vehicle comprising a body frame, front and rear pairs of wheels supporting said frame, yieldable means supporting the frame on the rear wheels, the frame having a rearward extension beyond the axis of the rear wheels, an engine supported by said frame extension entirely behind the axis of the rear wheels; and means for transmitting power from the engine to the rear wheels comprising a clutch, speed change gearing, and differential gearing all supported by the frame with the differential gearing substantially in the axis of the rear wheels and the speed change gearing in advance of said axis; the disposition of the engine and said power transmitting elements being such as to effect a weight distribution for the vehicle as a whole such that the product of the wheel base portions fore and aft of the center of gravity substantially equals the square of the radius of gyration about the center of gravity, said power transmitting means also including universally jointed drive shafts connecting the differential gearing and rear wheels and operative in all springing relations of the frame to the wheels.

20. A motor road vehicle of the kind set forth, said vehicle comprising a body frame, front and rear pairs of wheels supporting said frame, yieldable means supporting the frame on the rear wheels, the frame having a rearward extension beyond the axis of the rear wheels, an engine supported by said frame extension entirely behind the axis of the rear wheels; and means for transmitting power from the engine to the rear wheels comprising a clutch, speed change gearing, and differential gearing all supported by the frame with the differential gearing substantially in the axis of the rear wheels and the speed change gearing in advance of said axis; the disposition of the engine and said power transmitting elements being such as to position the center of gravity of the vehicle substantially from 25 to 45% of the length of the wheel base in front of the axis of the rear wheels with the product of the wheel base portions fore and aft of the center of gravity substantially equal to the square of the radius of gyration about the center of gravity, said power transmitting means also including universally jointed drive shafts connecting the differential gearing and rear wheels and operative in all springing relations of the frame to the wheels.

21. A motor road vehicle of the kind set forth, said vehicle comprising a frame, front and rear wheels for supporting said frame, an engine supported by the frame behind the axis of the rear wheels, differential gearing supported on the frame in driven relation to the engine, universally jointed independently pivoting drive shafts connecting the differential gearing and rear wheels, said shafts having rigid outer end portions on which the rear wheels are mounted, bearing members supporting said rigid shaft portions in normally substantially horizontal position, springs interposed between said bearing members and the frame, a bar extending transversely of the frame in the vicinity of said bearing members, and means connecting the ends of said bar with said bearing members to maintain said rigid shaft portions in operative position.

22. A motor road vehicle of the kind set forth, said vehicle comprising a frame, front and rear wheels for supporting said frame, an engine supported by the frame behind the axis of the rear wheels, differential gearing supported on the frame in driven relation to the engine, universally jointed independently pivoting drive shafts connecting the differential gearing and rear wheels, said shafts having rigid outer end portions on which the rear wheels are mounted, bearing members supporting said rigid shaft portions in normally substantially horizontal position, springs interposed between said bearing members and the frame, a bar extending transversely of the frame in the vicinity of said bearing members, and arms pivoted on said bar and attached at their free ends to said bearing members to maintain said rigid shaft portions in operative position.

23. A motor road vehicle of the kind set forth, said vehicle comprising a frame, front and rear wheels for supporting said frame, an engine supported by the frame behind the axis of the rear wheels, differential gearing supported on the frame in driven relation to the engine, universally jointed independently pivoting drive shafts connecting the differential gearing and rear wheels, said shafts having rigid outer end portions on which the rear wheels are mounted, bearing members supporting said rigid shaft portions in normally substantial horizontal position, springs interposed between said bearing members and the frame, a bar extending transversely of the frame in the vicinity of said bearing members, and means rigidly securing the ends of the bar to said bearing members to maintain said rigid shaft portions in constant substantial alignment.

24. A motor road vehicle of the kind set forth, said vehicle comprising a frame, front and rear wheels for supporting said frame, an engine supported by the frame behind the axis of the rear wheels, differential gearing supported on the frame in driven relation to the engine, rigid axle portions on which the rear wheels are mounted, bearing members supporting said axle portions in normally sustantially horizontal position, springs interposed between said bearing members and the frame, a bar extending transversely of the frame in the vicinity of said bearing members, arms pivoted on said bar and attached at their free ends to said bearing members to maintain said axle portions in operative position, and transmission means between said differential gearing and said axle portions operative in all relative positions of the frame to the axle portions.

25. In a motor road vehicle having front and rear pairs of wheels, an engine with flywheel, gear box, clutch and differential assembled as a unitary structure, the component parts of said unitary structure being so related and said structure being so mounted on the vehicle as to position the engine substantially behind the axis of the rear wheels with the fly-wheel at the front end of the engine and the differential substantially in the axis of the rear wheels, and to position the gear box and clutch forward of the axis of the rear wheels with the clutch in advance of the gear box, and drive connections between the differential and the rear wheels.

26. In a motor road vehicle having front and rear pairs of wheels, a rigid unitary driving structure including an engine and a differential, a vehicle frame including spaced cross members at its rear portion upon which said driving structure is supported with the differential substantially in the axis of the rear wheels and the engine behind said axis, universally jointed independently pivoting drive shafts connecting the differential gearing and rear wheels, said shafts having rigid outer end portions in which the rear wheels are mounted, bearing members supporting said rigid shaft portions in normally substantially horizontal position, springs interposed between said bearing members and the frame, and arms pivoted on one of said cross members and attached at their free ends to said bearing members to maintain said rigid shaft portions in operative position.

27. In a motor road vehicle having front and rear pairs of wheels and a body frame sprung on said wheels, a frame extension behind the axis of the rear wheels, a multi-cylinder engine supported on said extension behind the axis of the rear wheels, said engine having a substantially horizontal crank shaft extending longitudinally of the vehicle and being of the opposed cylinder type for the sake of longitudinal compactness; and means for transmitting power from the engine to the rear wheels comprising a clutch, speed change gearing and differential gearing all supported by the frame with the differential gearing substantially in the axis of the rear wheels; the engine and power transmitting means being closely associated to form a compact group extending longitudinally of the vehicle, the center of gravity of the said group being to the rear of the axis of the rear wheels but closely adjacent thereto so as to favorably affect the attainment of a center of gravity for the vehicle as a whole a substantial distance in advance of said axis, said power transmitting means also including universally jointed drive shafts connecting the differential gearing and rear wheels and operative in all springing relations of the frame to the wheels.

28. In a motor road vehicle having front and rear pairs of wheels and a body frame sprung on said wheels, a frame extension behind the axis of the rear wheels, a multi-cylinder engine supported on said extension behind the axis of the rear wheels, said engine having a substantially horizontal crank shaft extending longitudinally of the vehicle and being of the horizontal opposed cylinder type for the sake of longitudinal and vertical compactness; and means for transmitting power from the engine to the rear wheels comprising a clutch, speed change gearing and differential gearing all supported by the frame with the differential gearing substantially in the axis of the rear wheels; the engine and power transmitting means being closely associated to form a compact group extending longitudinally of the vehicle, the center of gravity of the said group being to the rear of the axis of the rear wheels but closely adjacent thereto so as to favorably affect the attainment of a center of gravity for the vehicle as a whole a substantial distance in advance of said axis, said power transmitting means also including universally jointed drive shafts connecting the differential gearing and rear wheels and operative in all springing relations of the frame to the wheels.

29. In a motor road vehicle having front and rear pairs of wheels and a body frame sprung on said wheels, a frame extension behind the axis of the rear wheels, a multi-cylinder engine supported on said extension behind the axis of the rear wheels, said engine having a substantially horizontal crank shaft extending longitudinally of the vehicle and being of the plural bank type for the sake of longitudinal compactness; and means for transmitting power from the engine to the rear wheels comprising a clutch, speed change gearing and differential gearing all supported by the frame with the differential gearing substantially in the axis of the rear wheels and the speed change gearing in front of said axis; said power transmitting means also including universally jointed drive shafts connecting the differential gearing and rear wheels and operative in all springing relations of the frame to the wheels.

30. In a motor road vehicle having front and rear pairs of wheels and a body frame sprung on said wheels, a frame extension behind the axis of the rear wheels, a multi-cylinder engine supported on said extension behind the axis of the rear wheels, said engine having a substantially horizontal crank shaft extending longitudinally of the vehicle and being of the horizontal opposed cylinder type for the sake of longitudinal and vertical compactness; and means for transmitting power from the engine to the rear wheels comprising a clutch, speed change gearing and differential gearing all supported by the frame with the differential gearing substantially in the axis of the rear wheels and the speed change gearing in front of said axis; said power transmitting means also including universally jointed drive shafts connecting the differential gearing and rear wheels and operative in all springing relations of the frame to the wheels.

In testimony whereof I have hereunto set my hand.

CHARLES DENNISTON BURNEY.